(12) United States Patent
Parlier et al.

(10) Patent No.: US 6,284,358 B1
(45) Date of Patent: Sep. 4, 2001

(54) TEXTILE PREFORMS SHEATHED IN A BORON NITRIDE COATING, COMPOSITES INCORPORATING THEM AND THEIR PREPARATION

(75) Inventors: Michel Parlier, Voisins le Bretonneux; Marcel Ropars, Rocquencourt; Michel Vaultier, Chateaugiron; Eric Framery, Cesson-Sevigne; Jean-Marie Jouin, Villeurbanne; Jean-Claude Cavalier, Le Pian Medoc, all of (FR)

(73) Assignee: Societe Nationale d'Etude et de Construction de Moteurs d'Aviation - S.N.E.M.C.A., Paris (FR)

( * ) Notice: Subject to any disclaimer, the term of this patent is extended or adjusted under 35 U.S.C. 154(b) by 0 days.

(21) Appl. No.: 09/331,726
(22) PCT Filed: Dec. 24, 1997
(86) PCT No.: PCT/FR97/02423
 § 371 Date: Jun. 25, 1999
 § 102(e) Date: Jun. 25, 1999
(87) PCT Pub. No.: WO98/29355
 PCT Pub. Date: Jul. 9, 1998

(30) Foreign Application Priority Data

Dec. 27, 1996 (FR) .................................................. 96 16104

(51) Int. Cl.[7] ..................................................... B32B 15/04
(52) U.S. Cl. ............................................................ 428/294.4
(58) Field of Search ........................................... 428/284.4

(56) References Cited

U.S. PATENT DOCUMENTS

| | | | |
|---|---|---|---|
| 5,204,295 | 4/1993 | Paine, Jr. et al. | 501/96 |
| 5,502,142 | 3/1996 | Sneddon et al. | 528/7 |

FOREIGN PATENT DOCUMENTS

| | | |
|---|---|---|
| 0 448 432 A1 | 9/1991 | (EP) . |
| 2 640 258 A1 | 6/1990 | (FR) . |
| 2 163 761 A | 3/1986 | (GB) . |

*Primary Examiner*—Edward J. Cain
(74) *Attorney, Agent, or Firm*—Weingarten, Schurgin, Gagnebin & Hayes LLP

(57) ABSTRACT

The present invention provides:
  fiber preforms sheathed in a boron nitride coating, said coating (generated on said previously-prepared fiber preforms) having a structure that is original: microporous and granular;
  thermostructural composite materials in which the reinforcing fabric is constituted by said fiber preforms; and
  methods of preparing said fiber preforms and said thermostructural composite materials, respectively.

Figure 1:
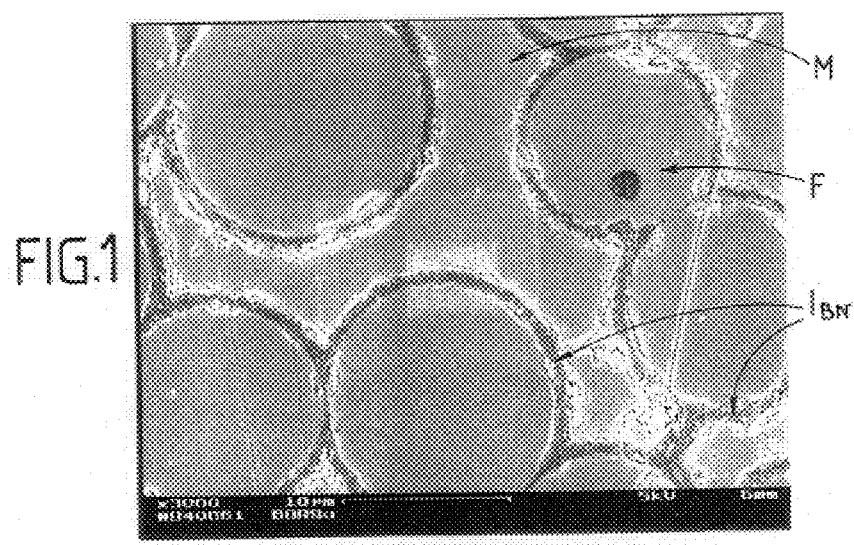

The composites of the invention have their fiber preforms, based on fibers (F), sheathed in an original interphase ($I_{BN}$) and embedded in the densification matrix (M).

17 Claims, 1 Drawing Sheet

TEXTILE PREFORMS SHEATHED IN A BORON NITRIDE COATING, COMPOSITES INCORPORATING THEM AND THEIR PREPARATION

The present invention relates to:

fiber preforms sheathed in a boron nitride coating, said coating (which is generated on said fiber preforms after they have been made) presenting an original structure;

thermostructural composite materials in which the reinforcing fabric is constituted by said fiber preforms; and preparing both said fiber preforms and said thermostructural composite materials.

For many years, the Applicant has been consolidating and densifying composites by a gaseous process, in particular composites having an SiC matrix, and by using the technique of chemical vapor infiltration (CVI). That technique is very reliable and it enables materials of very good quality to be made and it enables parts of relatively complex shapes to be made. However, in the context of reducing cost and time, certain steps of that technique can be replaced by a step using a liquid process.

In the chemical vapor infiltration (CVI) technique, the fiber preform to be treated is initially placed in an oven while held between graphite tooling so as to be coated with an interphase; said interphase may consist, in particular, in a layer of pyrolytic carbon or of boron nitride, presenting a microstructure that is lamellar. Said tooling is bulky and expensive, is of limited lifetime, and reduces the load capacity of the oven. Secondly, after an initial deposit of matrix material by a gaseous process, the preform is consolidated, so it is possible to remove said tooling for continued densification by a gaseous process (FR-A-2 714 076).

For the purpose of completely eliminating said graphite tooling, the Applicant has developed a method of consolidating fiber preforms by means of a liquid process. In that method, said preforms are preimpregnated with a phenolic type resin; thereafter, while being supported by metal tooling that can be reused for a large number of operations, the preforms are subjected to heat treatment (which cures and pyrolysizes said resin) after which they are in a state in which they are sufficiently consolidated to enable them to be densified by CVI and without using tooling. Unfortunately, the preforms densified with a ceramic matrix as obtained in that way do not present satisfactory mechanical properties insofar as during removal of the polymer (during pyrolysis), the residue thereof does not constitute a high performance interphase. In that method where consolation is implemented by a liquid process, it has therefore been found necessary to make an interphase by a gaseous process:

either prior to impregnation with the resin;

or else on the consolidated preforms (FR-A-2 707 287).

In order to avoid problems of oxidation associated with the presence of carbon, it is necessary to make an interphase and a consolidation matrix with one or more ceramic materials.

In this context, the Applicant has developed an original method which leads to a novel product that is particularly advantageous in certain variants. The method of the invention makes it possible to generate a coating of original structure on the surface of the fibers of the preforms, where said coating, from a certain thickness upwards, of itself performs both the function of an interphase and the function of a consolidating phase. Said film-forming coating coats the fibers of the preform in satisfactory and stable manner (a small amount of volume shrinking is observed at the end of pyrolysis and said generated coating does not become detached from the fibers) and it constitutes an interphase that makes dissipative breaking possible in the final composite material (i.e. a non-fragile mode of breaking).

The results on which the present invention are based have been obtained after research performed in different directions. The Applicant has tested various compounds as precursors for the consolidating phase, and in particular precursors for SiC, such as polyvinylhydrogenosilane (PVS and more precisely PVS 200 from Flamel Technologies) and polysilastyrene (PSS, and more particularly PSS 400 from Nippon Soda), taken separately or in mixtures, and precursors of BN, such as polyborazilene and condensed polyborazine. It is with this latter type of precursor that surprising and most advantageous results have been obtained. A BN coating of original structure presenting very high performance as an interphase (capable of constituting an effective consolidating interphase) and as a consolidating phase has been obtained. In characteristic manner, said BN coating presents a microporous granular structure (a cellular structure).

Thus, in a first aspect, the invention provides fiber preforms in which the reinforcing fibers are sheathed in a boron nitride coating designed to constitute an interphase between said fibers and a matrix for densifying said preforms; said boron nitride coating, made (generated) on the previously-prepared fiber preforms, presents, in characteristic manner, a structure that is granular with micropores between the granules of said structure.

Such a cellular or microporous structure which is the result of small grains or granules being assembled together is entirely original for BN coating of fibers. In the prior art, BN coatings generated by a gaseous process generally present a structure that is dense, of the lamellar type. It is true that J. Am. Ceram. Soc., 74 (10), October 1991, pp. 2482–2488 reports obtaining a microporous BN coating using a gaseous process, but the structure of said coating remained of the stratified, lamellar type. The authors compared the porosity of said resulting microporous structure with that of turbostratic pyrolytic carbon. Within that structure, the stacking of the basic structural units is imperfect, thereby giving said structure its microporous lamellar character.

The original microporous granular structure of the BN coating of the invention has been observed, in particular, by means of micrographs (see the figures accompanied the present description).

For example, the inventors have observed BN granules of diameter lying in the range 40 nanometers (nm) to 50 nm, with the assembly thereof constituting a microporous coating with porosity of about 20%.

A cellular granular structure of the type of the invention is particularly advantageous in that firstly it limits crack propagation under stress and in that secondly it favors decoupling between the matrix and the reinforcement in the final composite materials, thus enabling them to break under stress in a manner that dissipates energy.

The boron nitride which sheaths the fibers of fiber preforms of the invention thus presents, in regular manner, in characteristic manner, a microporous granular structure. The pores of said structure are submicron-sized. They thus present, in general, a mean equivalent diameter that is less than 1 micron.

Said boron nitride can be deposited on the surface of said fibers of said preforms to a greater or lesser thickness. In general, the fiber preforms of the invention have their fibers sheathed in said microporous coating (BN) to a mean thickness lying in the range 0.1 micrometers (μm) to 1.2 μm.

Advantageously, to constitute a consolidating interphase, said microporous coating (BN) has a mean thickness that is equal to or greater than 0.4 μm, and thus generally lying in the range 0.4 μm to 1.2 μm. The mass of such a coating of the invention, which constitutes a consolidating interphase, thus generally represents about 10% to 15% of the mass of the fiber preform whose fibers are sheathed in said coating. It is specified at this point that the use of a greater mass is not excluded in any way from the present invention; i.e. said microporous BN coating could have a thickness greater than 1.2 μm. In any event, the thickness of said coating will generally be less than 5 μm.

Fiber preforms whose fibers have been sheathed in a microporous structure BN coating of smaller thickness e (e≦0.4 μm, generally 0.1 μm≦e<0.4 μm) nevertheless also form part of the first aspect of the present invention. They are novel. Said coating can constitute an interphase having acceptable properties.

Fiber preforms of the invention, sheathed in the BN coating of original structure (cellular or microporous granular coating) are generally based on refractory fibers selected from carbon fibers and fibers of ceramics of the carbide, nitride, or oxide type, in particular silicon carbide fibers.

In general, the fiber preforms of the invention have been obtained by spooling yarns, fibers, or threads, by stacking one-dimensional plies (sheets of threads or cables) or two-dimensional plies (cloth or felt), optionally bonded together by needling, by three-dimensional weaving of fibers or threads, . . . Said fiber preforms of the invention thus exist in a variety of embodiments. They can exist in any of the forms in which prior art fiber preforms exist.

In a second aspect, the invention relates to thermostructural composite materials obtained using fiber preforms of the invention that have been sheathed in their original BN coating. Said thermostructural composite materials are obtained in conventional manner by densifying said preforms with a matrix; said densification being implemented by CVI. The matrix concerned can be a carbon matrix or a ceramic matrix.

This second aspect of the present invention thus includes carbon/carbon (C/C) composites having reinforcement of carbon fibers sheathed in microporous granular BN and a carbon matrix, and ceramic matrix composites (CMCs) comprising reinforcement of refractory fibers (of carbon or ceramic) sheathed in microporous granular BN and a ceramic matrix; more particularly the invention includes composites of the C/SiC type (carbon fiber reinforcement and silicon carbide matrix) and of the SiC/SiC or oxide/SiC type (reinforcing fibers based on silicon carbide or on oxides, and matrix of silicon carbide). In the context of this second aspect of the present invention, particularly preferred composites are ceramic matrix composites of the latter type and more particularly SiC/SiC composites in which the reinforcing fibers of the preform are sheathed in a microporous granular boron nitride coating (said coating advantageously presenting sufficient thickness to constitute a consolidating interphase).

The third aspect of the present invention is a method of preparing fiber preforms sheathed in said original structure boron nitride coating. Said method, a liquid method, comprises:

preparing an anhydrous solution of condensed polyborazine;

impregnating under a dry inert atmosphere, and advantageously under dry argon or nitrogen, fiber preforms having a suitable surface state with said anhydrous solution of condensed polyborazine; and pyrolysizing said impregnated fiber preforms under a dry inert atmosphere, and advantageously under dry argon or nitrogen.

Said impregnation is implemented in characteristic manner with a solution of condensed polyborazine as the precursor for the cellular granular structure BN coating. Borazine, a colorless liquid monomer of very low viscosity, and having a boiling point of only 55° C., cannot be used directly for impregnating the fiber reinforcement of the desired final composite materials since it would be volatilized at the beginning of the subsequent pyrolysis heat treatment (without generating the BN precursor polymer). It must therefore be polymerized beforehand. In the context of the present invention, it is used polymerized and in condensed form. Polymerization is implemented under conditions that generate a condensed polymer, i.e. a polymer whose structure is based on fused borazine cycles. The present text goes into greater detail about this condensed polyborazine when describing a method of obtaining it: by chemically-induced polymerization of borazine and when describing the preparation of the impregnation solution which contains the precursor for the original BN coating of the invention. At this point it is specified that borazine, which is highly sensitive to hydrolysis (transforming it into boric acid and giving off ammonia), can be handled only in an atmosphere that is completely dry, and the same applies to its condensed polymer. Aware of these facts, the person skilled in the art will know how to implement the steps of polymerization and of impregnation out of the reach of moisture (in a dry atmosphere).

Impregnation by an anhydrous solution of condensed polyborazine is performed on previously-prepared fiber preforms whose fibers present an acceptable surface state, i.e. have generally previously been de-oiled. The person skilled in the art is not unaware that commercially-available fibers are put on the market in an oiled state in order to facilitate weaving. In general, said de-oiling consists in conventional manner in heat treatment. Such pretreatment (de-oiling) has been described in particular in FR-A-2 640 258. It is advantageously associated with treatment for reducing the quantity of oxygen on the surface of the fibers. This preparation of the fiber preforms prior to impregnation (or more particularly preparation of the fibers constituting said preforms) is a step familiar to the person skilled in the art.

Said preforms can be impregnated in various ways appropriate to their shape and their size. In particular, they can be impregnated ply-by-ply or by full immersion.

As mentioned above, the condensed polyborazine solution used is an anhydrous solution. In general it is a true solution, but it is not impossible to perform impregnation with sols. It is particularly recommended to use tetrahydrofuran (THF) as the solvent, or any other ether having a boiling point higher than that of said tetrahydrofuran (THF), such as ethylene glycol dimethyl ether (or 1,2-dimethoxyethane), commonly known as monoglyme. In the context of an advantageous implementation of the method of the invention, it is recommended to use anhydrous tetrahydrofuran (THF) or monoglyme as the solvent for the condensed polyborazine.

The quantity of solution that needs to be used is that which is capable of being retained in the preform by the capillary forces created by the fused individual fibers: it is determined on the basis of the empty volume (volume not occupied by the fibers) of the preform that is to be coated. The concentration of said polyborazine in said solution is naturally a function of the desired coating thickness. This technical point of the present invention presents no particular difficultly to the person skilled in the art for whom methods of consolidating fiber preforms by liquid processes are familiar. It can be mentioned at this point that calculating the mass $m_{PBA}$ of condensed polyborazine to be deposited on a yarn in order to obtain, after pyrolysis, an interphase of selected thickness $e_f$ leads to the following relationship:

$$m_{polyborazine} = R_{polymerization} n \, l \pi \rho_{borazine} \frac{V_i}{V_f} e_f(D + e_f)$$

in which:

$R_{polyborazine}$ is the polymerization efficiency:

$$R_{polymerization} = \frac{m_{polyborazine}}{m_{borazine}}$$

n is the number of fibers per yarn;

l is the total length of the yarn constituting the preform;

$\rho_{borazine}$ is the density of the borazine;

D is the diameter of the fibers;

$V_i/V_f$ is the ratio of the volume $V_i$ of borazine to be used over the volume $V_f$ of boron nitride that will result therefrom after the polyborazine intermediate has been polymerized.

The condensed polyborazine, precursor of the original BN coating of the invention, is obtained as mentioned above by polymerizing borazine.

It is known that said polymerization of borazine can be performed by one or other of the two reaction mechanisms outlined below:

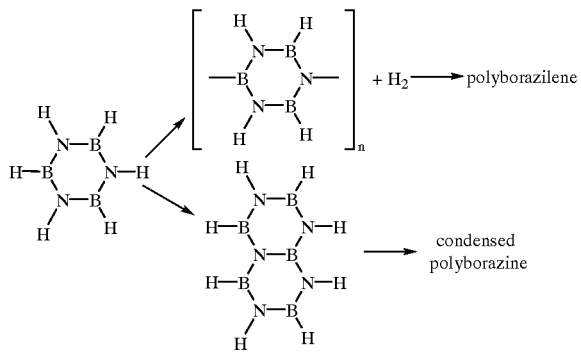

The first study of the polymerization of borazine was performed in 1961 by Laubengayer et al. (A. W. Laubengayer, P. C. Moaws, and R. F. Porter, J. Amer. Chem. Soc., 1961, 83, 1337). From 1990 to 1994, Sneddon et al. (P. J. Fazen, H. S. Beck, A. T. Lynch, E. E. Remsen, and L. G. Sneddon, Chem. Mater., 1990, 2, 96 and R. T. Paine and L. G. Sneddon, Chem. Tech., 1994, 29) obtained polyborazilene by thermolysis of borazine for a duration of 48 hours at 70° C. under vacuum. Those authors stated that the reaction takes place by a mechanism that is identical to the first of the two above reaction mechanisms, i.e. with hydrogen being given off. Said hydrogen must be removed periodically and one cannot be unaware of its dangerous character. Polyborazilene (of the polybiphenyl type) obtained using the first of said above mechanisms is described in patent US-A-5 502 142 as a ceramic precursor.

In 1995, the two intermediate entities: borazanaphthalene and diborazine were isolated and characterized by $^1$H and $^{11}$B NMR, by mass spectrometry and X-rays (P. J. Fazen, E. E. Remsen, J. S. Beck, P. J. Carroll, A. R. McGhie, and L. G. Sneddon, Chem. Mater., 1995, 7, 1942).

The inventors have the merit of having clearly established that:

when said polymerization is implemented without a chemical inducer (in accordance with the prior art), it takes place by both of the two above mechanisms, and the first in which the intermediate is of the polybiphenyl type leads to hydrogen being given off and extends over a long duration; and when said polymerization is implemented in the presence of a chemical inducer, only the second reaction scheme occurs, the scheme which passes via a naphthalene type intermediate (borazanaphthalene). Said second technique, in which a cycle is opened, and in which an aminoborane complex is involved, does not give rise to the release of gaseous hydrogen and it enables the reaction to be performed in less than 2 hours.

This second synthesis technique is entirely original. It thus generates condensed polyborazine, i.e. polyborazine in which the borazine cycles are fused. As explained above, this structure is different from the polybiphenyl type structure. It is also different from other structures within which borazine cycles are interconnected by —NH— type bridges (see the polymers described in patent US-A-5 204 295 and application GB-A-2 163 761) or bridges of the —N(CH$_3$)— type (see the polymers described in application EP-A-0 448 432).

This second technique for synthesizing polyborazine constitutes the preferred technique for gaining access to condensed polyborazine, precursor of the original BN coating of fiber preforms of the invention. It makes it possible to avoid the constraint associated with releasing a gas (H$_2$) during the reaction and it accelerates polymerization very considerably.

Thus, in the preferred variant of the method of the invention, the condensed polyborazine used in solution to impregnate fiber preforms is obtained by chemically induced polymerization of borazine. Said induced polymerization is implemented in an inert atmosphere and in an anhydrous medium in the presence of at least one inducer, advantageously selected from primary mono- and diamines, secondary amines, and ammonia.

In the context of this preferred variant, particularly recommended chemical inducers are as follows:

a primary amine having the formula R-NH$_2$ in which R is an alkyl group that is straight or branched, having 1 to 12 carbon atoms and in particular the primary amines having the following formula: MeNH$_2$, iPrNH$_2$, and nBuNH$_2$;

or a diamine having the formula H$_2$N—CH$_2$—(CH$_2$)$_n$—NH$_2$ in which n=1, 2, 3, 4, or 5, and in particular ethylene diamine (H$_2$N—CH$_2$—CH$_2$—NH$_2$);

or ammonia. In this context, said polymerization is advantageously implemented in the presence of excess gaseous ammonia or after the borazine has been put into solution in liquid ammonia.

With the secondary amines (RR'NH, such Et$_2$NH), it has been observed that the reaction requires a greater molar percentage of RR'NH in order to obtain identical mass yields. With tertiary amines (such as diazabicycloundecene or DBU), polymerization is much slower.

The induced (i.e. accelerated) polymerization of borazine as developed in the context of the present invention is generally implemented at a temperature lying in the range −100° C. to ambient temperature (it can also be performed at a higher temperature, limited by the reflux temperature of the reaction mixture), and with an effective quantity of inducer, which effective quantity can vary over a wide range (e.g. 5% to 300% molar, relative to borazine).

It is strongly recommended to use ethylene diamine or ammonia as the inducer of said polymerization. It is particularly preferred to use ammonia which, in the liquid state, favors intimate mixture of the reagents and, being greatly in excess, accelerates the reaction kinetics of the polymerization without giving rise to exothermal heating.

In a particularly preferred variant of the method of the invention, the condensed polyborazine used for impregnating the fiber preforms is obtained by polymerizing borazine put into solution in an excess of liquid ammonia (5 moles to 10 moles of ammonia per mole of borazine) and it is used for said impregnation in ethylene glycol dimethyl ether (monoglyme). Said polyborazine is used after the excess ammonia has been eliminated, where elimination can optionally be completed under a vacuum.

Mention is made above of condensed polyborazine obtained by (advantageously induced) polymerization of non-substituted borazine. It is not excluded from the context of the present invention to obtain condensed polyborazine, the precursor of the original BN coating, by polymerizing substituted borazines, and in particular N-alkyl and/or B-alkyl borazines (such as N-trimethylborazine and N-triisopropylborazine). The term "alkyl" is generally understood to mean a linear or branched alkyl ($C_1$–$C_8$) group. Thus, in the present specification, the term "borazine" covers borazine and substituted derivatives thereof, and the term "polyborazine" covers both polymers obtained by polymerizing borazine and those obtained by polymerizing derivatives thereof.

The method of the invention which, in characteristic manner, uses an anhydrous solution of condensed polyborazine for the impregnation stage includes a non-original step of pyrolyzing the impregnated preforms. Said pyrolysis step is advantageously implemented under dry nitrogen or argon (commonly up to 1000° C.). It can be implemented in the range 700° C. to 1 800° C.

The method of the invention—a liquid process—generates an original coating (BN ex-polyborazine) on the surface of fiber preforms, which coating presents a small amount of volume shrinkage and adheres well to said fiber preforms (no fragment of the coating becomes detached while the final composite is being put under stress). Furthermore, said coating is responsible for decoupling the fibers from the matrix which leads to breakage being dissipative, as desired, and it can constitute a consolidating interphase of high performance.

The Applicant has been unable to obtain similar results with coatings of SiC, ex-PVS, or ex-PSS. Said coatings do not constitute high performance interphases.

In a final aspect, the present invention also relates to a method of manufacturing composite materials incorporating as reinforcement fiber preforms that are coated in characteristic manner by said BN coating having microporous granular structure. Said method of manufacture includes:

manufacturing fiber preforms constituting the first aspect of the present invention (i.e. fiber preforms sheathed with a microporous granular BN coating), which manufacture is advantageously performed in accordance with the second aspect of the present invention (as described above) using an anhydrous solution of condensed polyborazine, advantageously obtained by chemically induced (accelerated) polymerization of borazine; and densification of said fiber preforms coated with said coating by means of CVI.

Said densification is performed using a known method (CVI). Insofar as the fiber preforms are obtained in the advantageously consolidated state (in the preferred variant they are obtained with BN coatings generated to have sufficient thickness to constitute a consolidated interphase), there is no need for any tooling during densification. In this advantageous variant, densification is implemented using consolidated fiber preforms.

Figure 2:
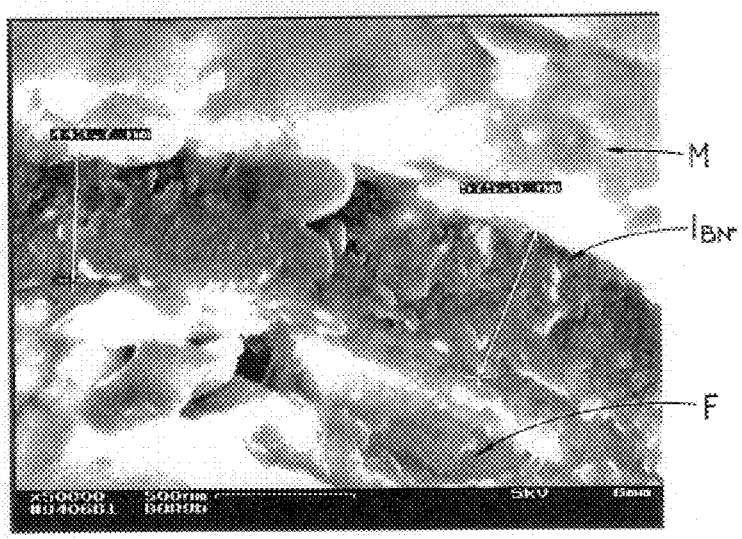
Figure 3:

The presently claimed invention is illustrated by the three accompanying figures (micrographs). They are sections through thermostructural composite materials of the invention at different magnifications:

in FIG. 1, a micrograph obtained at a magnification ×3000, the fibers F can clearly be seen sheathed in the BN coating of the invention (consolidating interphase $I_{BN}$), and embedded in the matrix M (SiC obtained by CVI);

in FIG. 2, a micrograph obtained at a magnification of ×50,000, the interphase zone $I_{BN}$ can be seen more clearly, having a thickness of about 0.5 µm; the microporous granular nature of said interphase $I_{BN}$ can be seen clearly in this picture; and in FIG. 3, a micrograph obtained at a magnification of ×100,000, there can be seen a detail of said interphase $I_{BN}$; its microporous granular structure is clearly visible.

The examples below illustrate each of said aspects of the present invention in non-limiting manner.

EXAMPLE 1

Preparation of Condensed Polyborazine by Polymerization Induced by 10% Ethylene Diamine 4.0 grams (g) of borazine were introduced into a 100 milliliter (ml) flask placed in a glove box under dry argon.

While stirring by rotating the flask, a volume of ethylene diamine $H_2N$—$CH_2$—$CH_2$—$NH_2$ corresponding to 10% molar of the quantity of borazine, i.e. 0.3 g was injected: the highly exothermal reaction gave rise to instantaneous formation of a gel accompanied by a polymer aerosol filling the flask and also to partial elimination of the borazine by vaporization, given its low boiling point (bp=55° C.).

Said flask was then provided with a rising coolant surmounted by a cock through which a flow of inert gas was introduced, advantageously dry argon (containing no more than 5 parts per million (ppm) to 10 ppm of water), so as to be in a position to continue the reaction outside the glove box. Heating at 95° C. for a period of 5 minutes (min) after a temperature rise of the same duration, sufficed to transform the gel into a solid polyborazine foam, leaving only very small traces of insolubles when put into the presence of THF.

The consequence of an uncontrollable fraction of the borazine evaporating was that the final yield was not very reproducible and generally lay in the range 70% to 90%.

Implementation of the Condensed Polyborazine Impregnation

Yarns of silicon carbide fibers of the Nicalon NLM 202 type manufactured by Nippon Carbon were de-oiled by applying heat. For some of them, the heat treatment was extended so as to reduce the surface oxygen content thereof due to silica being formed, in association with the de-oiling. The post-de-oiling treatment reduced the oxygen content by weight from 16% to 13%.

The yarns were then wound on a graphite frame so as to form 12 segments of length of 85 mm. After baking for about 20 minutes at about 120° C., for the purpose of eliminating absorbed water, the spooled frame was placed in a glove box under dry argon.

A preliminary test showed that each segment of the yarn was capable, by capillarity, of retaining 50 microliters ($\mu$l) of solution (solvent: THF) deposited by means of an automatic pipette.

The concentration was calculated for a first solution for obtaining a pyrolysate of 1.2 $\mu$m thickness on each fiber of one of the segments when 50 $\mu$l was deposited thereon. It was 13.6%. Said solution contained 3.3 g of condensed polyborazine and 20.7 g of anhydrous THF. It is referred to as the "mother" solution.

Each 50 $\mu$l thereof deposited on a segment of the yarn contained 3.7 mg of condensed polyborazine. It led to boron nitride of 1.2 $\mu$m thickness on each of the fibers.

Successive dilutions of the mother solution made it possible to obtain the following respective thicknesses of pyrolysate: 1.0 $\mu$m, 0.8 $\mu$m, 0.5 $\mu$m, 0.3 $\mu$m, and 0.1 $\mu$m by depositing 50 $\mu$l of the diluted solutions on each segment.

Their characteristics were as follows:

[PBA]=11.1% $\Rightarrow$m$_{PBA}$=3.0 mg of polyborazine per 50 $\mu$l $\Rightarrow$1.0 $\mu$m of pyrolysate

[PBA]=8.8% $\Rightarrow$m$_{PBA}$=2.4 mg of polyborazine per 50 $\mu$l $\Rightarrow$0.8 $\mu$m of pyrolysate

[PBA]=5.4% $\Rightarrow$m$_{PBA}$=1.5 mg of polyborazine per 50 $\mu$l $\Rightarrow$0.5 $\mu$m of pyrolysate

[PBA]=3.2% $\Rightarrow$m$_{PBA}$=0.9 mg of polyborazine per 50 $\mu$l $\Rightarrow$0.3 $\mu$m of pyrolysate

[PBA]=1.1% $\Rightarrow$m$_{PBA}$=0.3 mg of polyborazine per 50 $\mu$l $\Rightarrow$0.1 $\mu$m of pyrolysate Two segments of yarn were impregnated with the same solution in order to verify that the method is reproducible.

Pyrolysis

After the solvent had been evaporated, the frame was taken from the glove box to a Pyrolysis oven in a desiccator filled with dry argon.

The impregnated yarns were pyrolyzed on the frame in a graphite oven under an atmosphere of argon under the following conditions: rise at 0.5° C./min up to 750° C., and then at 2° C./min up to 1000° C., pause for 1 hour at said temperature, and return to ambient under the thermal inertia of the oven.

Densification

The yarns were densified on the frame by chemical vapor deposition (CVI) of silicon carbide (conventional method).

Characterization

After being removed from the frame, the composite yarns were characterized by micrographs of their orthogonal sections and their breakage zones after bending.

These observations showed that the boron nitride sheathed the fibers uniformly, regardless of whether the yarns were post-treated after de-oiling, and regardless of the quantity of polymer involved. Examining the appearance of the breaks showed progressive damage with fiber extraction, typical of dissipative breaking.

EXAMPLE 2

Preparation of Condensed Polyborazine by Polymerization Induced by Excess Ammonia (Liquefied Ammonia)

The reagents were inserted via a septum and in the ratio of 8 moles of ammonia per mole of borazine into a three-necked flash cooled to a temperature close to −60° C. and fed constantly with dry argon. In the present example, 14.0 g of borazine were introduced by means of a syringe filled in a glove box into 23.0 g of ammonia. The mixture of reagents was then in the form of a viscous liquid which was homogenized by means of a short period of stirring. After the temperature had risen to 0° C., which required about 2 hours after being withdrawn from the cyrogenic bath, the two reagents were both in the liquid state. This enabled them to be mixed intimately (which could not have been achieved if the ammonia (bp≈−33° C.) had been in the gaseous state). The low temperature also made it possible to absorb the heat given off by the highly exothermal nature of the reaction, and consequently made moderate reactivity possible without premature precipitation of a portion of the polymer, whose progressive cross-linking would have led to the final product being partially insoluble. At the end of the reaction, the condensed polyborazine was in the form of a foam that solidified quickly. Its mass was 17.3 g, i.e. greater than the mass of borazine that had been introduced, indicating that the ammonia had contributed to the composition of the final macromolecule. Consequently, the efficiency relative to the borazine monomer, the only efficiency that can be calculated under such circumstances (ill-controlled excess) was greater than 100%, lying in the range 120% to 125% from one test to another. Said efficiency shows that the method presents good reproducibility.

After the residual ammonia atmosphere had been extracted under a vacuum, monoglyme was introduced over a period not exceeding about 20 hours, leading to a very stable milky sol.

Monoglyme was selected in preference to THF (bp: 65° C.) because of its highly polar nature, which is favorable to long term stability of the resulting sol, and also because of its boiling point (bp: 84° C.) which gave greater flexibility in implementation by facilitating better control over time of the tackiness of the preimpregnated articles.

Implementation of the Condensed Polymer

Impregnation

The objective was to make four stacks of six plies of two-directional Nicalon NLM 202 cloth having the dimensions of 140 mm×50 mm:

two of the cloths were de-oiled by heat treatment only and were impregnated:
  one using a sol containing a mass of condensed polyborazine suitable for giving rise to a 1.2 $\mu$m thick interphase after pyrolysis; and
  the other using a sol containing a mass of condensed polyborazine suitable for giving rise to a 0.4 $\mu$m thick interphase after pyrolysis;

two of the cloths were de-oiled by heat treatment and then subjected to post-treatment for reducing the surface oxygen content of the fibers constituting them and they were impregnated:
  one using a sol containing a mass of condensed polyborazine suitable for giving rise to a 1.2 $\mu$m thick interphase after pyrolysis; and
  the other using a sol containing a mass of condensed polyborazine suitable for giving rise to a 0.4 $\mu$m thick interphase after pyrolysis.

The procedure was as follows:

each stack was placed in a Teflon-coated cloth vessel heated to about 120° C. for a period of 30 minutes, and the assembly was transferred to the glove box;

the volumes of the four Impregnation sols were chosen to have the same free volume in each of the stacks, i.e. 15 ml;

the mass of condensed polyborazine contained in each of the two sols for producing a 1.2 $\mu$m thick interphase was 4.2 g (i.e. [PBA]$_m$=32%); and the mass of condensed polyborazine contained in each of the two sols for producing a 0.4 $\mu$m thick interphase was 1.3 g (i.e. [PBA]$_m$=10%).

The sols were poured on the corresponding stacks and were dried so as to evaporate the solvent.

Pyrolysis

After the solvent had evaporated, transport to the oven and pyrolysis were performed as in Example 1.

Densification

Densification was performed conventionally, by CVI, until a density of about 2.3 had been obtained.

Characterization

The mechanical properties of the densified composites were tested. Typically, traction strength values of 150 MPa and elongation values of 0.15% to 0.2% were obtained.

This mean performance is close to that which used to be obtained with the first generation of SiC/SiC composites having a pyrolytic carbon (PyrC) interphase.

What is claimed is:

1. Fiber preforms in which the reinforcing fibers are sheathed in a boron nitride coating which constitutes an interphase between said fibers and a matrix for densifying said preforms, the preforms being characterized in that said boron nitride coating, generated on said previously-prepared fiber preforms, presents a structure that is granular with micropores between the granules of said structure.

2. Fiber preforms according to claim 1, characterized in that said coating has a mean thickness lying in the range 0.1 $\mu$m to 1.2 $\mu$m.

3. Consolidated fiber preforms according to claim 1, characterized in that said coating, constituting a consolidating interphase, has a mean thickness lying in the range 0.4 $\mu$m to 1.2 $\mu$m.

4. Fiber preforms according to claim 1, characterized in that they are constituted by refractory fibers selected from carbon fibers and ceramic fibers of the carbide, nitride, or oxide type, in particular silicon carbide fibers.

5. Thermostructural composite materials based on fiber reinforcement densified by matrix and characterized in that said fiber reinforcement consists in a preform according to claim 1.

6. Thermostructural composite materials according to claim 5, of the SiC/SiC type.

7. A method of manufacturing fiber preforms according to claim 1, the method being characterized in that it comprises:

preparing an anhydrous solution of condensed polyborazine;

impregnating under a dry inert atmosphere, and advantageously under dry argon or nitrogen, fiber preforms having a suitable surface state with said anhydrous solution of condensed polyborazine; and pyrolysizing said impregnated fiber preforms under a dry inert atmosphere, and advantageously under dry argon or nitrogen.

8. The method according to claim 7, characterized in that said condensed polyborazine is obtained by chemically-induced polymerization of borazine; said polymerization being implemented in an inert atmosphere and in an anhydrous medium in the presence of at least one inducer advantageously selected from primary mono- or di-amines, secondary amines, and ammonia.

9. The method according to claim 8, characterized in that said inducer is a primary amine of formula R—NH$_2$ in which R is a straight or branched alkyl group having 1 to 12 atoms of carbon, or a diamine of formula H$_2$N—CH$_2$—(CH$_2$)$_n$—NH$_2$ in which n=1, 2, 3, 4, or 5.

10. The method according to claim 7, characterized in that said impregnation is performed with said condensed polyborazine in solution in anhydrous tetrahydrofuran (THF) or anhydrous ethylene glycol dimethyl ether (monoglyme).

11. The method according to claim 7, characterized in that said condensed polyborazine is obtained by polymerizing borazine put into solution in liquid ammonia, and in that said impregnation is implemented with said condensed polyborazine in anhydrous ethylene glycol dimethyl ether (monoglyme).

12. The method according to claim 7, characterized in that said impregnation is implemented on de-oiled fiber preforms, optionally post-treated to reduce their surface oxygen content.

13. A method of manufacturing composite materials according to claim 5, characterized in that it comprises:

manufacturing fiber preforms according to any one of claims 7 to 12, the resulting boron nitride coatings advantageously presenting thickness such that said preforms sheathed in said coatings are consolidated; and densifying said coated and advantageously consolidated fiber preforms by CVI.

14. Consolidated fiber preforms according to claim 2, characterized in that:

said coating, constituting a consolidating interphase, has a mean thickness lying in the range 0.4 $\mu$m to 1.2 $\mu$m; and they are constituted by refractory fibers selected from carbon fibers and ceramic fibers of the carbide, nitride, or oxide type, in particular silicon carbide fibers.

15. Thermostructural composite materials of the SiC/SiC type based on fiber reinforcement densified by matrix and characterized in that said fiber reinforcement consists in a preform according to claim 3.

16. A method of manufacturing fiber preforms according to claim 14, the method being characterized in that it comprises:

preparing an anhydrous solution of condensed polyborazine;

impregnating under a dry inert atmosphere, and advantageously under dry argon or nitrogen, fiber preforms having a suitable surface state with said anhydrous solution of condensed polyborazine; and pyrolysizing said impregnated fiber preforms under a dry inert atmosphere, and advantageously under dry argon or nitrogen;

and further characterized in that:

said condensed polyborazine is obtained by chemically-induced polymerization of borazine; said polymerization being implemented in an inert atmosphere and in an anhydrous medium in the presence of at least one inducer advantageously selected from primary mono- or di-amines, secondary amines, and ammonia;

said inducer is a primary amine of formula R—$NH_2$ in which R is a straight or branched alkyl group having 1 to 12 atoms of carbon, or a diamine of formula $H_2N$—$CH_2$—$(CH_2)_n$—$NH_2$ in which n=1,2,3,4 or 5;

said impregnation is performed with said condensed polyborazine in solution in anhydrous tetrahydrofuran (THF) or anhydrous ethylene glycol dimethyl ether (monoglyme);

said condensed polyborazine is obtained by polymerizing borazine put into solution in liquid ammonia, and in that said impregnation is implemented with said condensed polyborazine in anyhydrous ethylene glycol dimethyl ether (monoglyme); and said impregnation is implemented on de-oiled fiber preforms, optionally post-treated to reduce their surface oxygen content.

17. A method of manufacturing composite materials according to claim 16, characterized in that it comprises:

providing a resulting boron nitride coatings advantageoulsy presenting thickness such that said preforms sheathed in said coatings are consolidated; and densifying said coated and advantageously consolidated fiber preforms by CVI.

* * * * *

UNITED STATES PATENT AND TRADEMARK OFFICE
CERTIFICATE OF CORRECTION

PATENT NO. : 6,284,358 B1
DATED : September 4, 2001
INVENTOR(S) : Michel Parlier et al.

It is certified that error appears in the above-identified patent and that said Letters Patent is hereby corrected as shown below:

Title page,
Item [73], Assignee, "S.N.E.M.C.A." should read -- S.N.E.C.M.A. --; and Column 1,
Line 50, "consolation" should read -- consolidation --.

Signed and Sealed this

Twenty-seventh Day of August, 2002

Attest:

JAMES E. ROGAN
*Attesting Officer*     *Director of the United States Patent and Trademark Office*